United States Patent
Weyer

[19]

[11] Patent Number: 5,975,728
[45] Date of Patent: Nov. 2, 1999

[54] METHOD AND APPARATUS FOR PROVIDING USER SELECTABLE MULTI-COLOR AUTOMOBILE INSTRUMENT PANEL ILLUMINATION

[76] Inventor: Frank M. Weyer, 10 Cranberry La., E. Falmouth, Mass. 02536

[21] Appl. No.: 08/964,512

[22] Filed: Nov. 5, 1997

[51] Int. Cl.⁶ ........................................... F21Q 1/00
[52] U.S. Cl. .................... 362/489; 362/30; 362/510; 362/545
[58] Field of Search ................ 362/29, 30, 489, 362/510, 543, 544, 545

[56] References Cited

U.S. PATENT DOCUMENTS

| | | | |
|---|---|---|---|
| 3,174,576 | 3/1965 | Woofer et al. | 362/489 X |
| 3,590,233 | 6/1971 | Protzmann | 362/30 |
| 4,845,595 | 7/1989 | Fujii et al. | 362/29 X |
| 4,882,659 | 11/1989 | Gloudemans | 362/489 X |
| 5,003,433 | 3/1991 | Fournier | 362/29 |
| 5,030,893 | 7/1991 | Spira et al. | 362/30 X |
| 5,150,257 | 9/1992 | Mohabbatizadeh et al. | 362/29 X |
| 5,247,429 | 9/1993 | Iwase et al. | 362/30 X |
| 5,406,303 | 4/1995 | Salmon et al. | 362/30 X |

*Primary Examiner*—Laura K. Tso

[57] ABSTRACT

The present invention comprises a method and apparatus for providing user selectable multi-color illumination to automotive instrument panel instruments. In one embodiment, an instrument panel or individual instrument is supplied with a plurality of differently colored illumination sources. The intensity of each color is individually controllable, allowing the user to select both intensity and hue of instrument illumination. In one embodiment, an instrument panel illumination system comprises three light sources that produce nominally white light and three associated diffusing filters, one red, one green, one blue. In another embodiment different colors of illumination are provided by light sources producing different colors of light, such as, for example, a plurality of high intensity red, green, and blue light emitting diodes ("LED's"). In one embodiment, a plurality of triplets of red, green and blue high intensity LED's are mounted above a white diffusing filter. In one embodiment, a plurality of colored light sources are mounted in an instrument housing behind the instrument's bezel.

17 Claims, 5 Drawing Sheets

5,975,728

METHOD AND APPARATUS FOR PROVIDING USER SELECTABLE MULTI-COLOR AUTOMOBILE INSTRUMENT PANEL ILLUMINATION

FIELD OF THE INVENTION

The present invention relates to instrument panel illumination systems, and more particularly to a method and apparatus for providing user selectable multi-color automobile instrument panel illumination.

BACKGROUND OF THE INVENTION

FIG. 1 shows a perspective view of an example automotive instrument panel of the prior art. FIG. 2 shows a side, cut away view of the instrument panel of FIG. 1. As shown in FIG. 1, instrument panel 100 consists of a housing 105 having a generally triangular cross section, as shown in FIG. 2. As shown in FIG. 1, housing 105 has opaque top, back, and right, and left sides 115, 110, 117 and 116, respectively, and a transparent front panel 120. Instruments such as a speedometer 150 and tachometer 155 and other indicators such as a clock, temperature, oil pressure, and fuel gauges are typically mounted to back side 110. The faces of these instruments are typically supplied with measurement marks and numbers in white or another bright color that stands out against the background of back side 110, which is typically black. As shown in FIG. 2, the housings 200 of instruments such as speedometer 150 and tachometer 155 typically extend outwards from back side 110 of instrument panel 100.

The faces of the dashboard instruments are typically illuminated by one or more illumination units. In the embodiment of FIG. 1, two illumination units 122 and 124, respectively, are used. Multi-colored illumination unit 122 includes a translucent light diffusing panel 125 and a light source 130. Similarly, illumination unit 124 includes a diffusing panel 135 and a light source 140. Light sources 130 and 140 are typically 12 volt electric light bulbs that produce white light. Diffusing panels 125 and 135 are typically pieces of translucent plastic. Diffusing panels 125 and 135 are both the same color. The most common colors are white, reddish-orange, and green. The purpose of diffusing panels 125 and 135 are to disperse the light of bulbs 130 and 140, respectively, so as to provide even lighting of the instrument faces on back side 110. As shown in FIG. 2, light from each bulb is dispersed by its respective diffusing panel, reflects off transparent front panel 120, and illuminates back side 110.

In the prior art, the intensity of dashboard instrument illumination is variable, but the color is fixed. The intensity may be adjusted by a driver by adjusting the intensity of the light emitted by the light sources, typically using a variable resistance control. The color of the illuminated instrument faces is determined by the color of the markings on the face of the instruments and the color of the diffusing panels. For example, if the instrument markings are white, the markings when illuminated appear to be the same color as that of the diffusing panels. If white diffusing panels are used, the instrument markings appear white. If orange diffusing panels are used, the instrument markings appear orange. If green diffusing panels are used, the instrument markings appear green.

Up until now, the color of dashboard instrument illumination available in a particular car is fixed and determined by the car manufacturer, even though a purchaser or driver of a vehicle may prefer a different color from the color implemented by the manufacturer. There is a need for a system that allows a driver to select a desired instrument illumination color.

SUMMARY OF THE INVENTION

The present invention comprises a method and apparatus for providing user selectable multi-color illumination to automotive instrument panel instruments. In one embodiment, an instrument panel or individual instrument is supplied with a plurality of differently colored illumination sources. The intensity of each color is individually controllable, allowing the user to select both intensity and hue of instrument illumination. In one embodiment, an instrument panel illumination system comprises three light sources that produce nominally white light and three associated diffusing filters, one red, one green, one blue. In another embodiment different colors of illumination are provided by light sources producing different colors of light, such as, for example, a plurality of high intensity red, green, and blue light emitting diodes ("LED's"). In one embodiment, a plurality of triplets of red, green and blue high intensity LED's are mounted above a white diffusing filter. In one embodiment, a plurality of colored light sources are mounted in an instrument housing behind the instrument's bezel.

DETAILED DESCRIPTION OF THE INVENTION

The present invention comprises a method and apparatus for providing multi-color instrument panel and instrument illumination. In the following description, numerous specific details are set forth in order to provide a more thorough description of the invention. It will be apparent, however, to one skilled in the art that the invention may be practiced without these specific details. In other instances, well-known features have not been described in detail so as not to obscure the invention.

Figure 1:
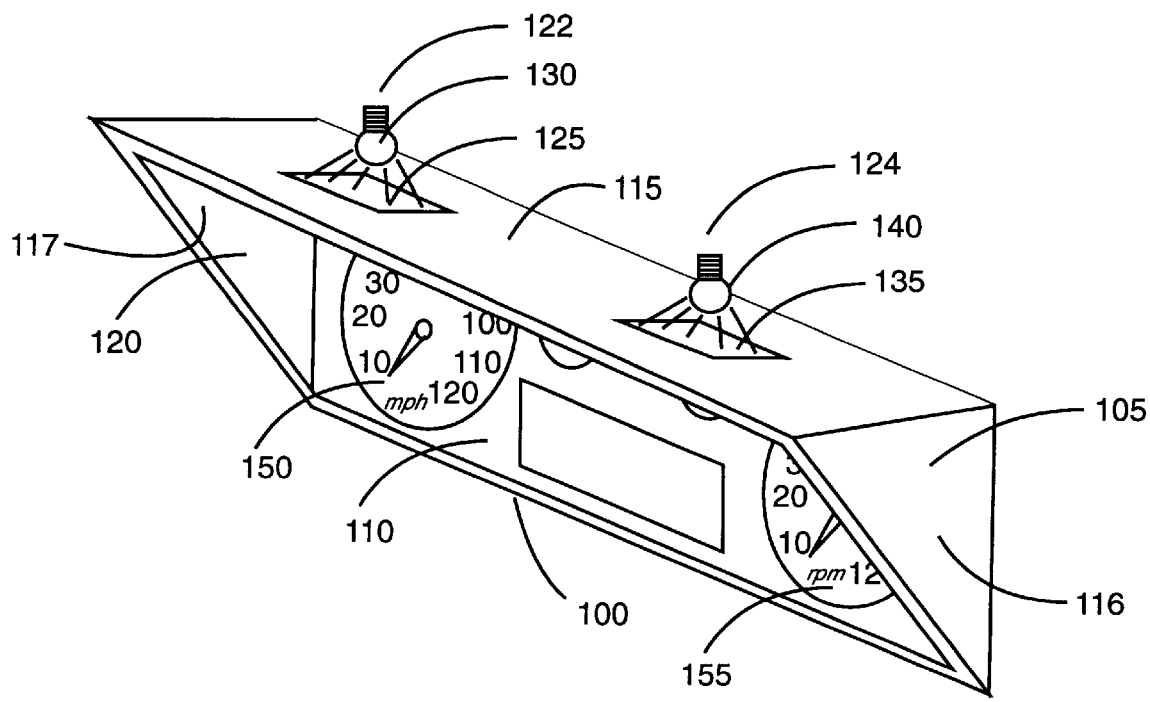
FIG. 1 is a perspective view of an instrument panel using an instrument illumination system of the prior art.
Figure 2:
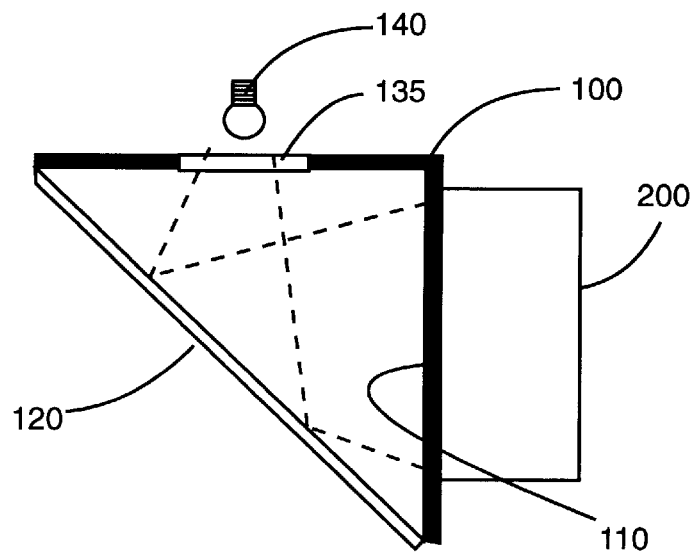
FIG. 2 is a side sectional view of the instrument panel of FIG. 1.
Figure 3:
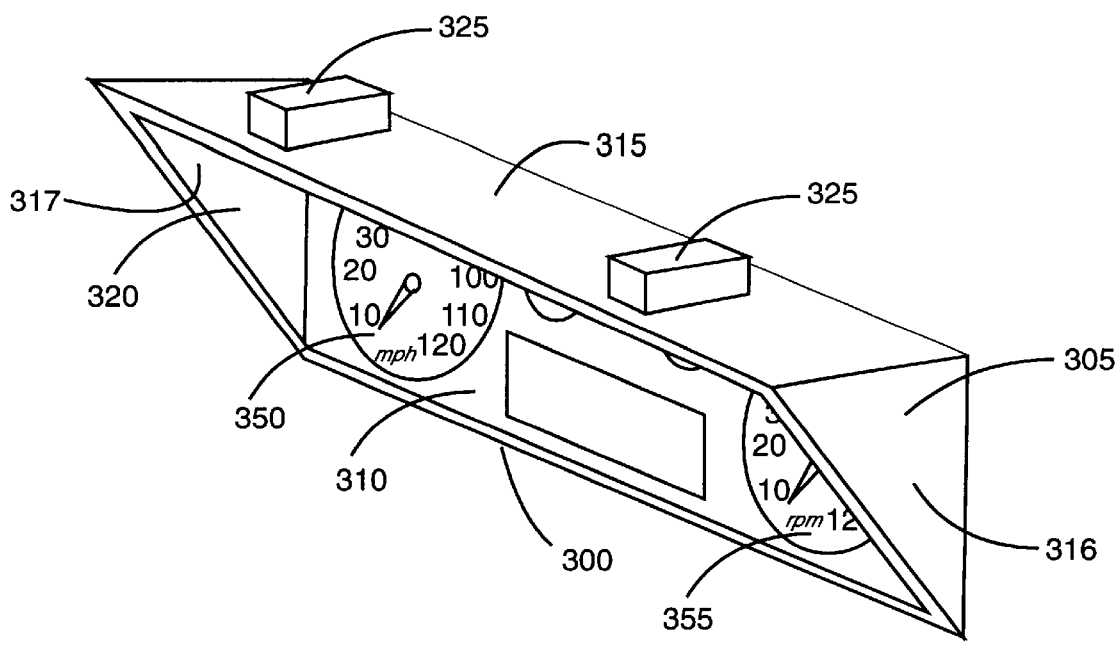
FIG. 3 is a perspective view of an instrument panel using an embodiment of the multi-colored instrument illumination system of the invention.

An instrument panel using an embodiment of the multi-colored instrument illumination system of the invention is shown in FIG. 3. Instrument panel 300 of FIG. 3, like instrument panel 100 of the prior art shown in FIG. 1, comprises a housing 305 having a generally triangular cross section. Housing 305 has opaque top, back, and right, and left sides 315,310,316 and 317, respectively, and a transparent front panel 320. Instruments such as a speedometer 350, tachometer 355 and other indicator gauges are typically mounted to back side 310. In one embodiment, the markings on the faces of these instruments painted white to standout against the darker background color of back side 310, which, in one embodiment, is black.

The faces of the instruments are illuminated by one or more multi-colored illumination units 325. One embodiment of a multi-colored illumination unit 325 is shown in FIG. 4.

Figure 4:
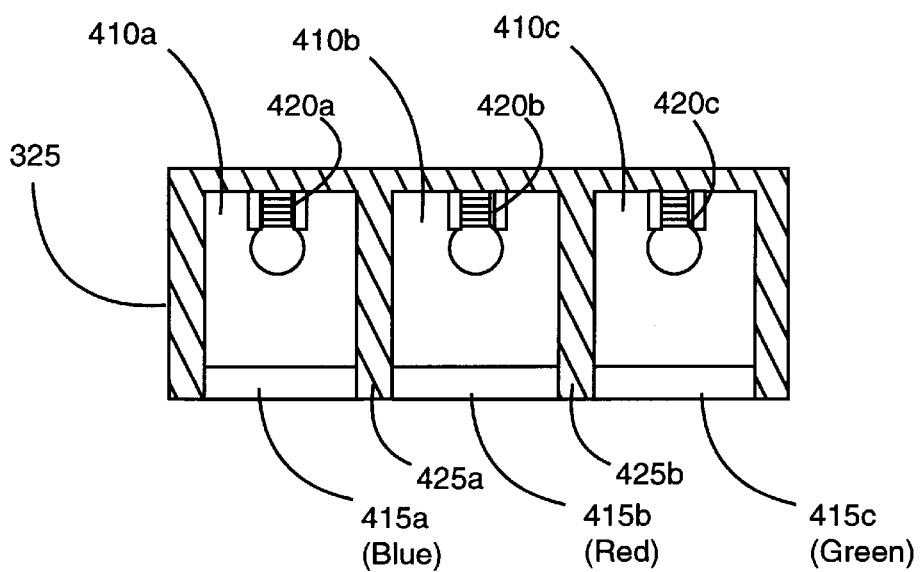
FIG. 4 is a side sectional view of an embodiment of a multi-colored illumination source of the invention.

In the embodiment of FIG. 4, multi-colored illumination unit 325 comprises three separate sections 410a, 410b, and 410c. Sections 410a, 410b and 410c include translucent light diffusing filters 415a, 415b, and 415c, respectively, and light sources 420a, 420b, and 420c, respectively. In one embodiment, sections 410a–c are separated by partitions 425a and 425b such that light from each section does not intrude into an adjacent segment. In one embodiment, light sources 420a–c produces nominally white light. In one embodiment, light sources 420a–c are 12 volt electric light bulbs. In one embodiment, diffusing filters 415a–c are pieces of translucent plastic. Unlike in the prior art, each of diffusing filters 415a–c are of different colors. In one embodiment, diffusing filter 415a is blue, diffusing filter 415b is red, and diffusing filter 415c is green. Each of diffusing filters 415a–c disperses the light of light sources 420a–c, respectively, so as to provide even lighting of the instrument faces on back side 310 of instrument panel 300. Light source 420a in combination with blue diffusing filter 415a produces blue light. Light source 420b in combination with red diffusing filter 415a produces red light. Light source 420c in combination with green diffusing filter 415c produces green light. By selectively controlling the intensity of light produced by light sources 420a–c, multi-colored illumination unit 325 can be used to provide dashboard illumination of a variety of colors.

The intensity of light sources 420a–c may be controlled using any of a variety of control mechanisms or systems as are well known in the art. For example, in one embodiment, simple on-off switches can be used that allow each light source to be either on or off. In this embodiment, a separate control is used to control the intensity of the light produced by the multi-colored illumination unit as a whole. This embodiment allows multi-colored illumination unit 325 to produce up to seven discrete colors, depending on the bulb or bulbs activated. In another embodiment, separate potentiometers, which may be ganged, are used to control the intensity of each bulb, allowing a large range of colors to be produced. Other control circuits, including a variety of analog and digital circuits, can be used to control the absolute and relative intensities of the illumination produced by each of illumination sources 420a–c, as will be apparent to those skilled in the art.

Figure 5:
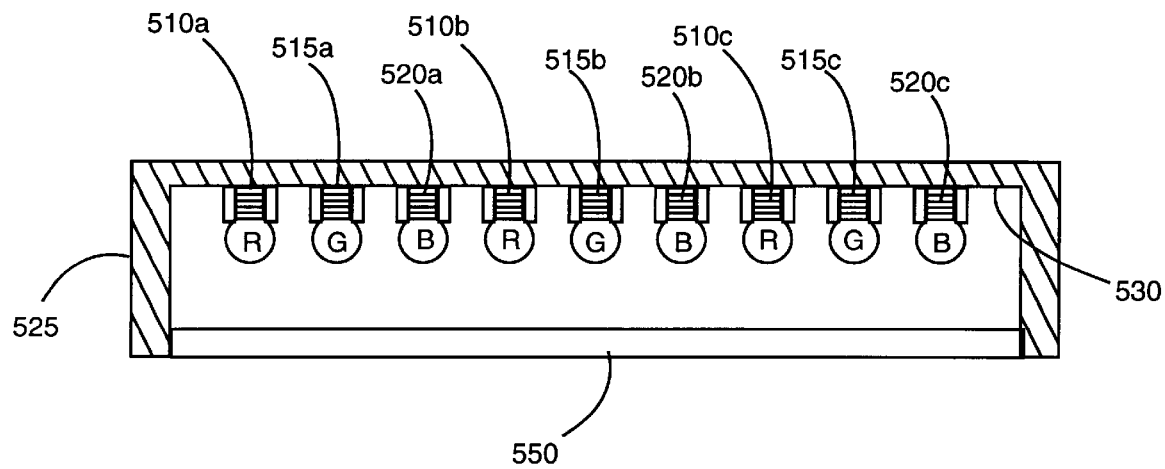
FIG. 5 is a side sectional view of an embodiment of a multi-colored illumination source of the invention.

Another embodiment of a multi-colored illumination unit of the invention is shown in FIG. 5. In the embodiment of FIG. 5, a plurality of differently colored light sources 510a–c, 515a–c, and 520a–c, respectively, are mounted along the inside of top 530 of illumination unit 525. Multi-colored illumination unit 525 may also include a diffusing filter 550. However, diffusing filter 550 may be omitted, for example if the light produced by light sources 510,515, and 520 is sufficiently dispersed without a diffusing filter. In the embodiment of FIG. 5, light sources 510 produce red light, light sources 515 produce green light, and light sources 520 produce blue light. In one embodiment, light sources 510, 515, and 520 are colored light bulbs. In another embodiment, light sources 510, 515, and 520 are light emitting diodes. Any of a variety of other colored light sources, including backlit colored LCD panels, can be used.

In the embodiment of FIG. 5, the color of light emitted by multi-colored illumination unit 525 is controlled by controlling the relative intensities of the light emitted by the sets of light sources 510, 515 and 520, respectively. Any of a variety of analog, digital, and hybrid control circuits can be used to control the intensities of the light sources.

Figure 6:
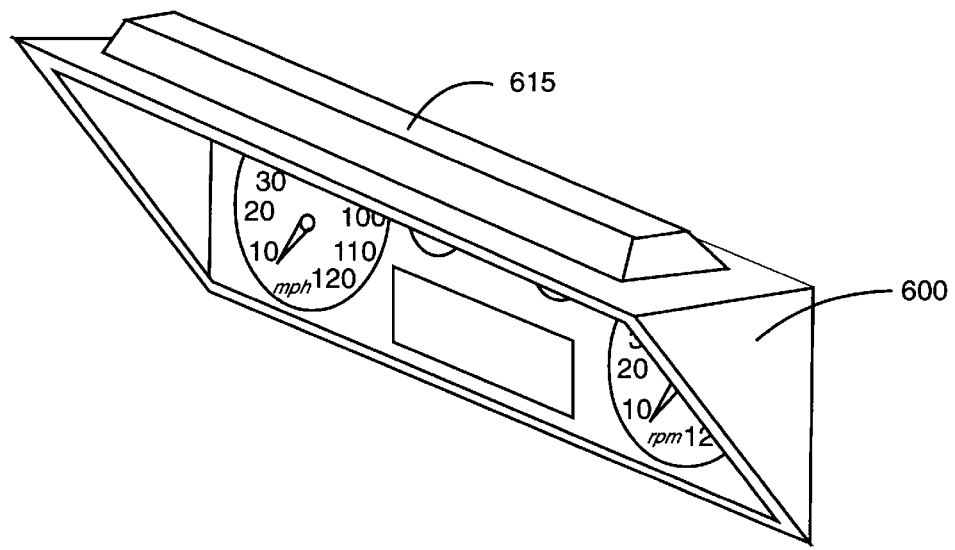
FIG. 6 is a perspective view of an instrument panel using an embodiment of the multi-colored instrument illumination system of the invention.

Multi-colored illumination unit 525 of FIG. 5 contains three sets of each of light sources 510,515, and 520, respectively. Other embodiments can have more or fewer of each color light source, may have more or fewer than three different colors of light sources, and may have unequal numbers of light sources of each color. Multi-colored illumination unit 525 may have any desired number of light sources arranged in any desired manner. Multi-colored illumination unit 525 may also have any desired size and shape. For example, multiple multi-colored illumination units 525 may be arranged transversely, as are units 325 in FIG. 3, or a single unit may be arranged longitudinally, as is unit 615 in FIG. 6. Further, illumination sources may be arranged in any desired pattern inside illumination unit 525. In one or more embodiments, the intensity of illumination produced by the set of light sources of a particular color is varied by varying the number of illumination sources of that color that are turned on. In other embodiments, the illumination of the light produced by the illumination units is controlled by other analog and digital control systems as are well known in the art.

Figure 7:
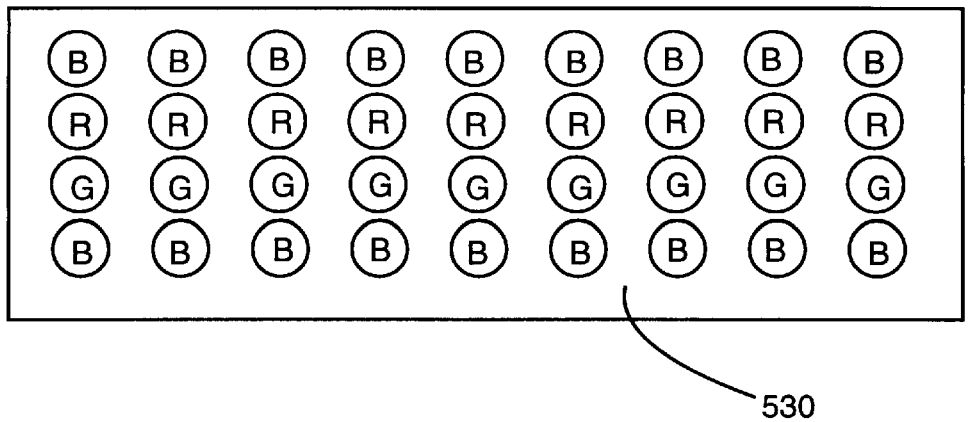
FIG. 7 shows an arrangement of light sources in an embodiment of the invention.
Figure 8:
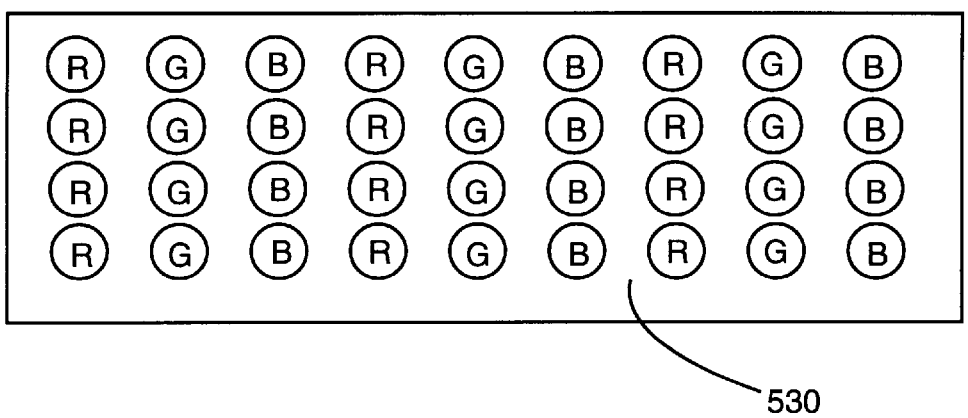
FIG. 8 shows an arrangement of light sources in an embodiment of the invention.
Figure 9:
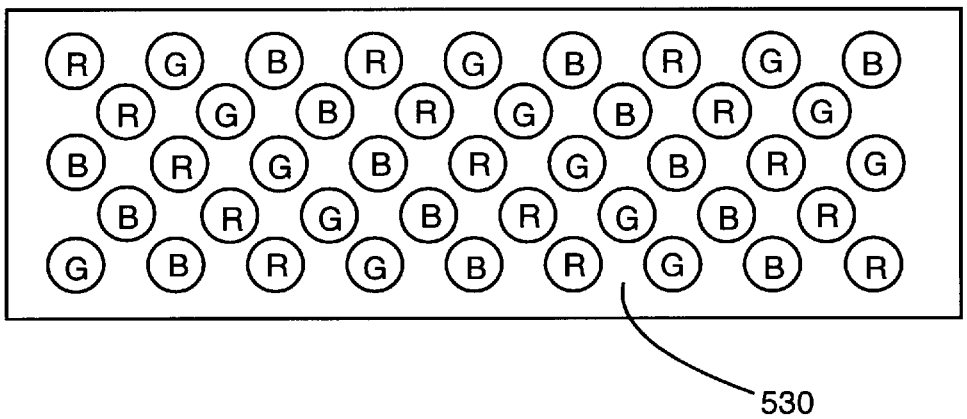
FIG. 9 shows an arrangement of light sources in an embodiment of the invention.

FIGS. 7, 8 and 9 are plan views of the underside of top panel 530 of illumination unit 525 showing some of the ways in which differently colored light sources can be arranged, for example, along the underside of top panel 530 of illumination unit 525. In each of FIGS. 7, 8 and 9, red light sources are identified by the letter "R," green light sources by the letter "G," and blue light sources by the letter "B." In FIG. 7, the light sources of each color are arranged in parallel longitudinal rows, and there are twice as many blue light sources than red and green light sources. Such an arrangement may be desired, for example, in instances where the light output of the individual blue light sources is less than that of the red and green light sources. The relative numbers of light sources of illumination sources of each color may be varied in other manners to equalize the overall intensity of illumination of each color, or for other reasons.

In FIG. 8, the light sources of each color are arranged in parallel transverse rows. In FIG. 9, the light sources of each color are arranged in a diagonal pattern.

Figure 10:
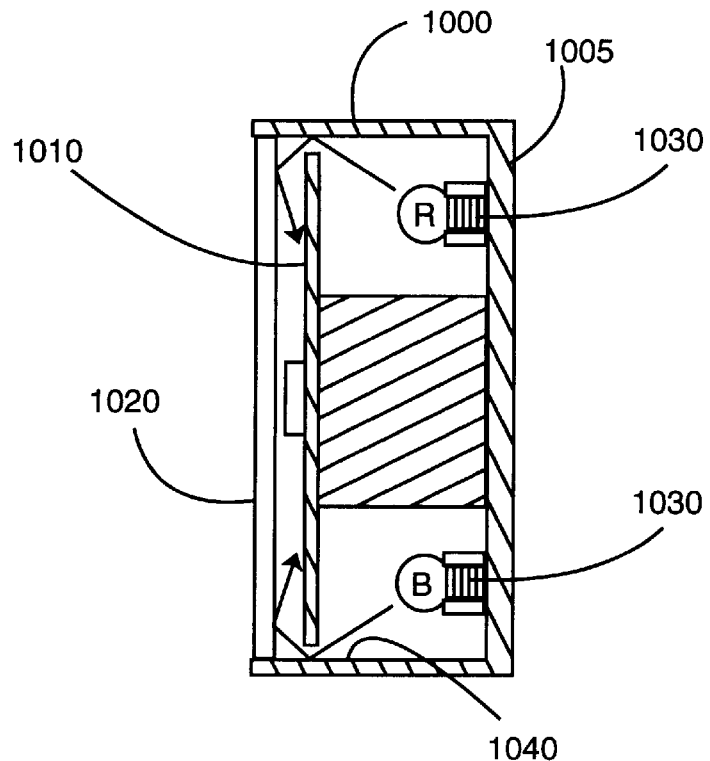
FIG. 10 is a sectional view of an instrument comprising an embodiment of an integrated instrument illumination system of the invention.
Figure 11:
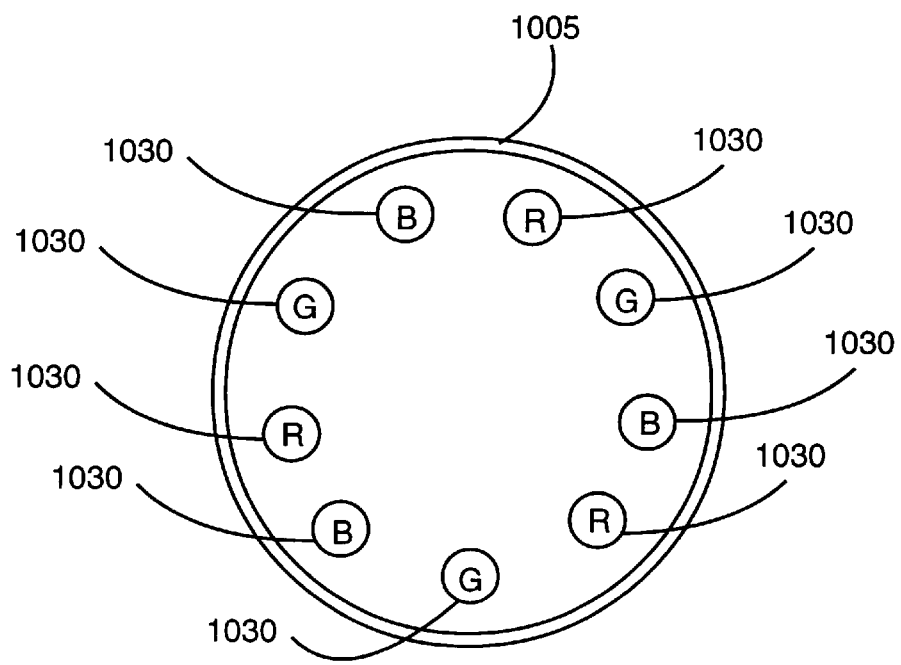
FIG. 11 shows an arrangement of light sources in an embodiment of the invention.

FIG. 10 shows an embodiment of an instrument illumination system of the invention in which the instrument illumination system is incorporated in the instrument itself. FIG. 10 shows a side sectional view of an instrument 1000, which may, for example, be a speedometer, a tachometer, a temperature guage, a clock, an oil pressure gauge, etc. Instrument 1000 includes a housing 1005. In one embodiment, housing 1005 is generally cylindrical, with an open end towards the front. The open end is fitted with a transparent cover 1020, through which a bezel 1010 containing instrument markings is visible. As shown in FIG. 10, bezel 1010 has a diameter less than the inside diameter of housing 1005. A plurality of light sources 1030 of a plurality of colors are mounted inside housing 1005 generally behind bezel 1010. As indicated by the arrows in FIG. 10, light from light sources 1030 reflects off the side wall 1040 through the gap between bezel 1010 and side wall 1040, bounces off the inside of transparent cover 1020, and illuminates the front markings on bezel 1010. In one or more embodiments, the inside surfaces of side wall 1040 are treated (for example given a matt white coloring) to enhance dispersion of the reflected light, or to provide a reflective color filter (in which case single color light sources can be used in conjunction with differently colored reflective filters distributed around side wall 1040). Light sources 1030 may, as in other embodiments, comprise light bulbs, LED's, or other light sources. Any desired number and type of light sources can be mounted in any desired manner inside housing 1005. In one embodiment, shown in FIG. 11, light sources 1030 are mounted in a radial pattern on the inside back side of housing 1005.

Thus, a multi colored instrument panel instrument illumination system has been presented. It will be apparent to those skilled in the art that although specific details and embodiments have been presented as examples, other details and embodiments may be used for the present invention, all of which are intended to be encompassed within the scope of this invention. For example, although light bulbs and light emitting diodes as been described as the light sources used in one or more embodiments of the invention, other kinds of light sources can be used. Further, any of a variety of tinted, colored, or other filters can be used for the filters of the invention. In addition, although the invention has been described with respect to automotive instrument panels, it will be apparent to those skilled in the art that the multicolored instrument panel illumination system of the invention can be used with other types of instrument panels and instruments, including, without limitation, marine, aviation, and electronic device instruments. Other variations will be apparent to those skilled in the art.

I claim:

1. An automobile instrument panel illumination system comprising:

a plurality of differently colored, electrically powered illumination sources disposed so as to provide illumination to a face of at least one instrument of an instrument panel, each of said illumination sources providing a specific color of illumination to said face of said at least one instrument;

a color selection control system comprising electrical switches controlling an amount of electrical power delivered to said plurality of differently colored illumination sources allowing a user to select a desired color of illumination for said face of said at least one instrument by controlling said amount of electrical power delivered to said differently colored illumination sources.

2. The instrument panel illumination system of claim 1 wherein said illumination sources comprise a plurality of like-colored light sources disposed so as to provide illumination to said face of at least one instrument of said instrument panel and a plurality of differently colored filters disposed between said light sources and said face.

3. The instrument panel illumination system of claim 1 wherein said illumination sources comprise a plurality of differently colored light sources disposed so as to provide illumination to said face of at least one instrument of said instrument panel.

4. The instrument panel illumination system of claim 3 wherein at least one of said illumination sources comprises a filter disposed between at least one of said light sources and said face.

5. The instrument panel illumination system of claim 4 wherein said filter comprises a diffusing filter.

6. The instrument panel illumination system of claim 2 wherein said plurality of filters comprise a plurality of diffusing filters.

7. The instrument panel illumination system of claim 2 wherein said plurality of filters comprises red, green, and blue filters.

8. The instrument panel illumination system of claim 2 wherein said light sources comprise light bulbs.

9. The instrument panel illumination system of claim 2 wherein said light sources comprise light emitting diodes.

10. The instrument panel illumination system of claim 3 wherein said light sources comprise red, green, and blue light sources.

11. The instrument panel illumination system of claim 3 wherein said light sources comprise colored light bulbs.

12. The instrument panel illumination system of claim 3 wherein said light sources comprise light emitting diodes.

13. The instrument panel illumination system of claim 3 wherein said light sources comprise a plurality of light sources of each of a plurality of colors.

14. The instrument panel illumination system of claim 13 wherein said light sources comprise different numbers of light sources of each of a plurality of colors.

15. The instrument panel illumination system of claim 1 wherein said color selection control system comprises means for controlling a collective intensity of a plurality of light sources producing light of a color by selectively activating a number of said light sources.

16. The instrument panel illumination system of claim 15 wherein said light sources comprise light emitting diodes.

17. The instrument panel illumination system of claim 1 wherein said electrical switches of said color selection control system comprise digital circuit elements.

* * * * *